(12) United States Patent
Sawal et al.

(10) Patent No.: US 11,601,305 B2
(45) Date of Patent: Mar. 7, 2023

(54) PHYSICAL INFRASTRUCTURE/VIRTUAL INFRASTRUCTURE INTEGRATION SYSTEM

(71) Applicant: Dell Products L.P., Round Rock, TX (US)

(72) Inventors: Vinay Sawal, Fremont, CA (US); Abhishek Jain, San Ramon, CA (US); Aditya Narravula, San Jose, CA (US); Joseph LaSalle White, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 303 days.

(21) Appl. No.: 17/124,276

(22) Filed: Dec. 16, 2020

(65) Prior Publication Data
US 2022/0191063 A1 Jun. 16, 2022

(51) Int. Cl.
*H04L 12/46* (2006.01)
*G06F 9/455* (2018.01)
*G06F 16/25* (2019.01)
*G06F 16/28* (2019.01)
*G06F 16/901* (2019.01)

(52) U.S. Cl.
CPC ...... *H04L 12/4641* (2013.01); *G06F 9/45558* (2013.01); *G06F 16/258* (2019.01); *G06F 16/287* (2019.01); *G06F 16/9024* (2019.01); *G06F 2009/45595* (2013.01)

(58) Field of Classification Search
CPC . H04L 12/4641; G06F 16/287; G06F 16/258; G06F 16/9024; G06F 9/45558; G06F 2009/45595
See application file for complete search history.

(56) References Cited

U.S. PATENT DOCUMENTS

| | | | |
|---|---|---|---|
| 10,192,001 B2* | 1/2019 | Leeman-Munk | G06N 3/0454 |
| 10,860,622 B1* | 12/2020 | Florissi | G06F 16/22 |
| 11,178,011 B1* | 11/2021 | Marwah | H04L 43/062 |
| 2020/0100155 A1* | 3/2020 | Gupta | H04W 36/08 |
| 2020/0334276 A1* | 10/2020 | Conway | G16B 50/00 |
| 2022/0051264 A1* | 2/2022 | Compton | G06F 21/64 |

* cited by examiner

*Primary Examiner* — Frantz B Jean
(74) *Attorney, Agent, or Firm* — Joseph Mencher

(57) ABSTRACT

A physical networking/virtual infrastructure management integration system includes a physical networking infrastructure management system providing physical networking infrastructure management subsystems, a virtual infrastructure management system providing virtual infrastructure management subsystems, and a network integration system. The network integration system identifies at least one affiliation between service endpoints provided by the physical networking infrastructure management subsystems and the virtual infrastructure management subsystems, and generates an affiliation graph that identifies each of the service endpoints and each affiliation between pairs of the service endpoints. The network integration system then converts the affiliation graph to a bipartite graph that includes a controller group including a first subset of the service endpoints and a controlled group including a second subset of the service endpoints, and launches a respective service container for each of the first subset of the service endpoints in the controller group.

20 Claims, 9 Drawing Sheets

| SERVICE ENDPOINT 602 | SERVICE ENDPOINT 604 | AFFILIATION ATTRIBUTE 606 | AFFILIATION VALUE 608 | METHOD 610 | OVERRIDE (DISABLE?) 612 |
|---|---|---|---|---|---|
| VC-1 | SFS-1 | MAC | 00:0a:95:9d:68:17 | Dynamic | No |
| SFS-4 | VC-1 | MAC | 00:0a:95:9d:68:16 | Dynamic | No |
| VC-2 | SFS-2 | MAC | 00:0a:95:9d:68:18 | Dynamic | No |
| VC-3 | SFS-4 | Asset Tag | 6XVHV | Pre-provisioned | No |
| SFS-5 | VC-3 | MAC | 00:0a:95:9d:68:19 | Dynamic | No |
| SFS-2 | VC-4 | Asset Tag | 7SHV6 | Pre-provisioned | Yes |
| VC-2 | SFS-1 | MAC | 00:0a:95:9d:68:20 | Dynamic | No |
| VC-3 | SFS-1 | MAC | 00:0a:95:9d:68:21 | Dynamic | No |
| SFS-2 | VC-3 | MAC | 00:0a:95:9d:68:22 | Dynamic | No |
| SFS-5 | SFS-6 | MAC | 00:0a:95:9d:68:23 | Dynamic | No |
| SFS7 | - | MAC | 00:0a:95:9d:68:24 | Dynamic | No |
| VC-2 | SFS-3 | MAC | 00:0a:95:9d:68:25 | Dynamic | No |
| ... | ... | ... | ... | ... | ... |

FIG. 6

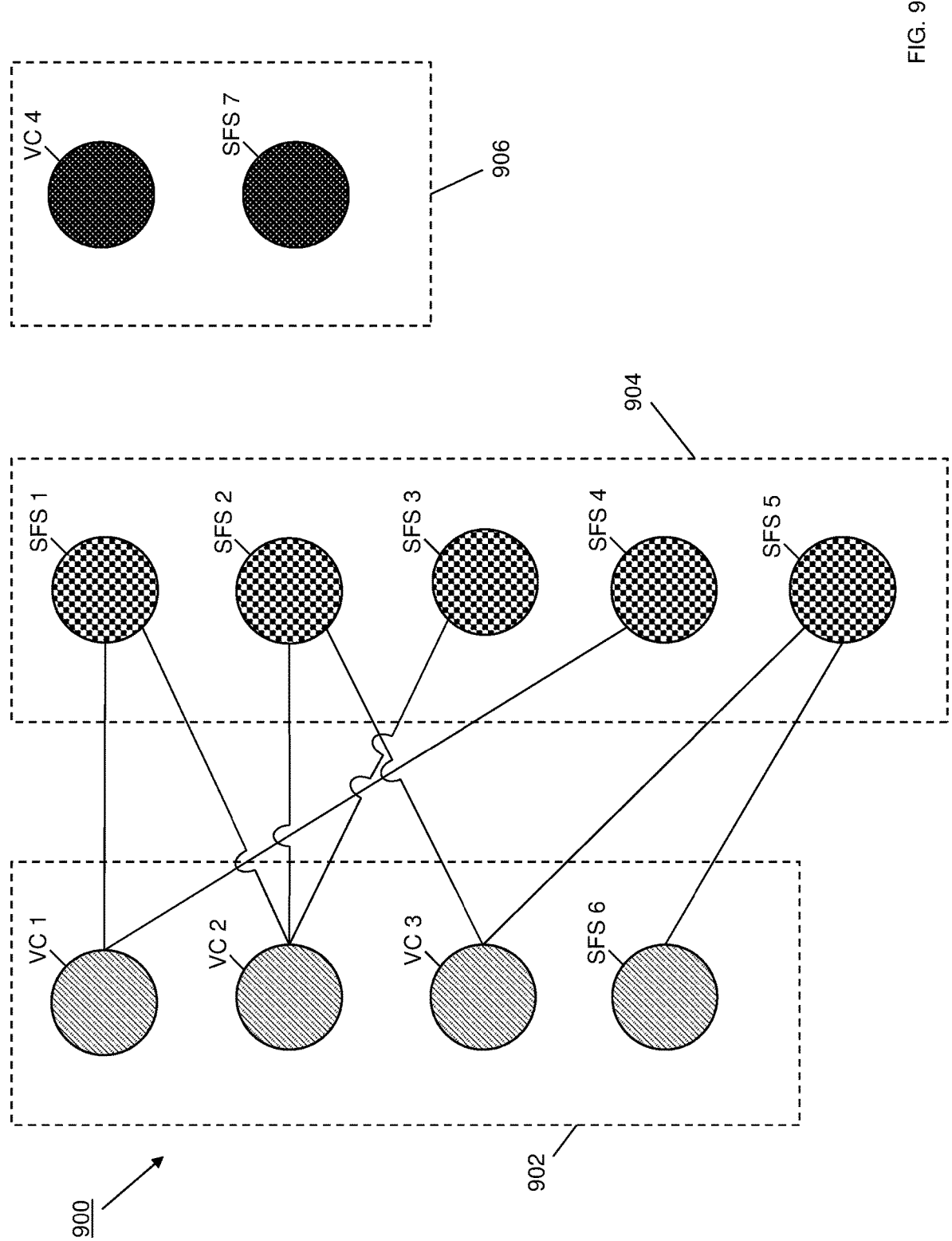

PHYSICAL INFRASTRUCTURE/VIRTUAL INFRASTRUCTURE INTEGRATION SYSTEM

BACKGROUND

The present disclosure relates generally to information handling systems, and more particularly to integrating physical infrastructure and virtual infrastructure provided by information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may be utilized to provide a Software Defined Datacenter (SDDC) including a combination of physical infrastructure and virtual infrastructure that is integrated to provide a variety of SDDC functionality known in the art. For example, network integration systems such as the OpenManage Network Integration (OMNI) system available from DELL EMC® Inc. of Hopkinton, Mass., United States, may be utilized with an SDDC in order to automate and manage the integration of physical networking infrastructure management systems and virtual infrastructure management systems utilized in the SDDC. Typically, any changes in the configuration of virtual infrastructure (e.g., changes to a virtual networking configuration) in an SDDC would otherwise require a network administrator to perform a variety of inefficient and cumbersome operations to configure (or reconfigure) underlying physical infrastructure (e.g., physical networking component(s)), and networking integration systems attempt to alleviate the need to manually perform such operations by monitoring the virtual infrastructure for changes and, in response to such changes, automatically synchronizing the physical infrastructure to support the virtual infrastructure changes. For example, the OMNI system discussed above accomplishes the functionality discussed above by integrating with virtual infrastructure management subsystems in the SDDC (e.g., the VCENTER® centralized management utility available from VMWARE® of Palo Alto, Calif., United States), and physical networking infrastructure management subsystems in the SDDC (e.g., SMART FABRIC SERVICES (SFS)® available from DELL EMC® Inc. of Hopkinton, Mass., United States).

However, network integration systems like the OMNI system discussed above are often deployed as virtual appliances with the automation features discussed above provided as micro-services deployed as containers ("service containers"), which can create some issues, particularly as the number of virtual infrastructure management subsystems and physical networking infrastructure management subsystems integrated by the network integration system increase. For example, in order to provide comprehensive network automation coverage in an SDDC, network integration systems like the OMNI system discussed above launch a service container for each combination of virtual infrastructure management subsystem and physical networking infrastructure management subsystem (each virtual/physical infrastructure management subsystem pair), thus providing [(#of virtual infrastructure management subsystems)×(#of physical networking infrastructure management subsystems)] service containers. Once a particular service container is launched, that service container identifies changes in its corresponding virtual infrastructure management subsystem, and modifies physical network attributes on its corresponding physical networking infrastructure management subsystem to synchronize the virtual network provided by the virtual infrastructure management subsystem with the physical network provided by the physical networking infrastructure management subsystem.

However, network integration systems (e.g., the virtual machine providing that network integration system) have limited resources that can only support a maximum number of service containers, and the growing number of virtual infrastructure management subsystems and physical networking infrastructure management subsystems presents a scalability issue. For example, if a network integration system is required to support 10 simultaneous virtual infrastructure management subsystems and 20 physical networking infrastructure management subsystems, "zero-touch" automation of network integration will require that network integration system to provide 200 service containers. Furthermore, management of the growing number of automation services provided by such service containers is also an issue, as each automation service produces corresponding logs, alerts, events, notifications, and/or other service container information known in the art, which provides an additional load on system resources and can result in an undesirable user experience.

Accordingly, it would be desirable to provide a network integration system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a network integration engine that is configured to: identify at least one affiliation between a plurality of service endpoints provided by a plurality of physical networking infrastructure management subsystems included in a physical networking infrastructure management system and a plurality of virtual infrastructure management subsystems included in a virtual infrastructure management system; generate an affiliation graph that identifies each of the plurality of service endpoints and each affiliation between pairs of the plurality of service endpoints; convert the affiliation graph to a bipartite graph that includes a controller group including a first subset of the plurality of service endpoints and a controlled group including a second subset of the plurality of service endpoints; and launch a respective service container for each of the first subset of the plurality of service endpoints in the controller group.

BRIEF DESCRIPTION OF THE DRAWINGS

FIG. 6 is a table view illustrating an embodiment of a service endpoint affiliation table generated by the network integration system of FIG. 3 during the method of FIG. 4.

FIG. 9 is a schematic view illustrating a bipartite graph generated by the network integration system of FIG. 3 during the method of FIG. 4.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
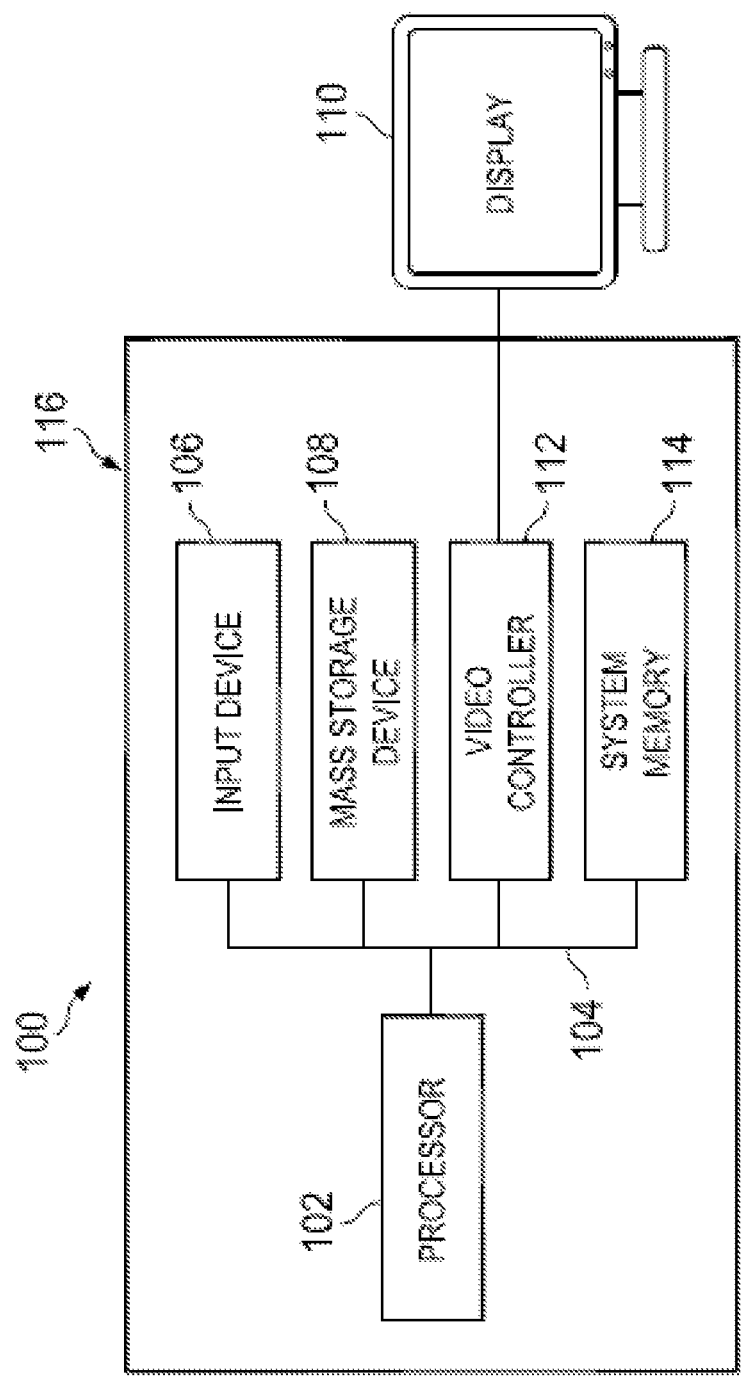
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
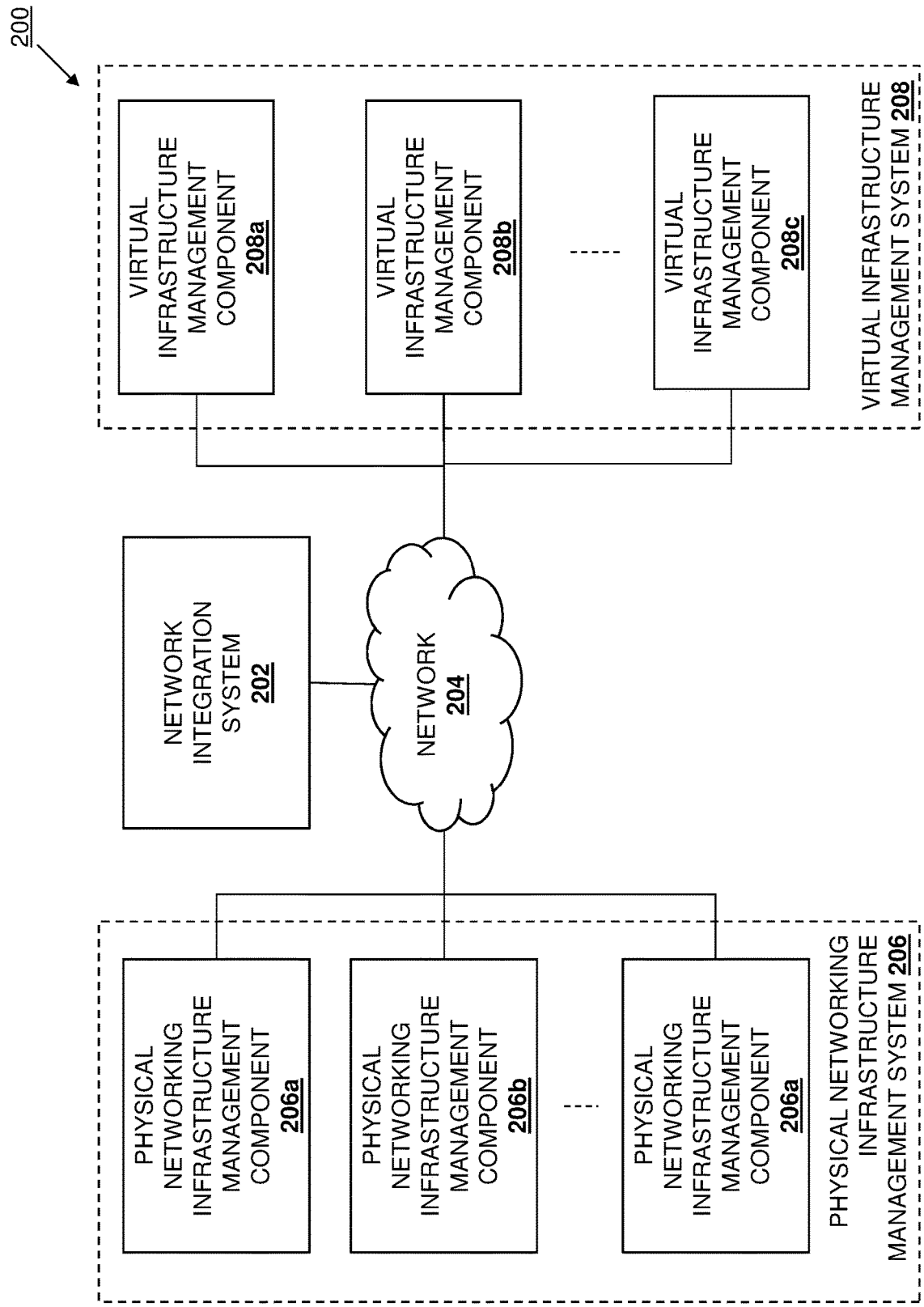
FIG. 2 is a schematic view illustrating an embodiment of a networked system.

Referring now to FIG. 2, an embodiment of a networked system 200 is illustrated. In the illustrated embodiment, the networked system 200 includes a network integration system 202. In an embodiment, the network integration system 202 may be provided by the IHS 100 discussed above with reference to FIG. 1, and/or may include some or all of the components of the IHS 100, and in specific examples may include one or more server devices that are configured to provide the OpenManage Network Integration (OMNI) system available from DELL EMC® Inc. of Hopkinton, Mass., United States. However, while illustrated and discussed as including server device(s) configured to provide a particular network integration system, one of skill in the art in possession of the present disclosure will recognize that network integration systems and/or devices provided in the networked system 200 may include any systems and/or devices that may be configured to operate similarly as the network integration system 200 discussed below.

In the illustrated embodiment, the network integration system 202 is coupled to a network that may be provided by a Local Area Network (LAN), the Internet, combinations thereof, and/or other networks that would be apparent to one of skill in the art in possession of the present disclosure. The networked system 200 includes physical infrastructure that is coupled to the network 204 and that, in the examples illustrated and discussed below, is provided by a physical networking infrastructure management system 206 that includes a plurality of physical networking management components 206a, 206b, and up to 206c. In the specific examples provided below, the physical networking management components 206a-206c are provided by a plurality of spine switch devices and leaf switch devices that are configured to provide a fabric services system such as, for example, the Smart Fabric Services (SFS) system available from DELL EMC® Inc. of Hopkinton, Mass., United States. However, while described below as being provided by a particular physical networking infrastructure management system 206 that includes particular physical networking management components 206a-206c that are configured to provide a particular "south bound" integration subsystem, one of skill in the art in possession of the present disclosure will appreciate that a variety of physical infrastructure may be integrated using the network integration system 202 while remaining within the scope of the present disclosure as well.

The networked system 200 also includes virtual infrastructure that is coupled to the network 204 and that, in the examples illustrated and discussed below, is provided by a virtual infrastructure management system 208 that includes a plurality of virtual infrastructure management components 208a, 208b, and up to 208c. In the specific examples provided below, the virtual infrastructure management components 208a-208c are provided by a plurality of server devices that are configured to provide a centralized management system such as, for example, the VCENTER® centralized management utility available from VMWARE® of Palo Alto, Calif., United States. However, while described below as being provided by a particular virtual infrastructure management system 208 that includes particular virtual infrastructure management components 208a-208c that are configured to provide a particular "north bound" integration subsystem, one of skill in the art in possession of the present disclosure will appreciate that a variety of virtual infrastructure may be integrated using the network integration system 202 while remaining within the scope of the present disclosure as well. As such, while a specific networked system 200 has been illustrated and described, one of skill in the art in possession of the present disclosure will recognize that the networked system of the present disclosure may include a variety of components and component configurations while remaining within the scope of the present disclosure as well.

Figure 3:
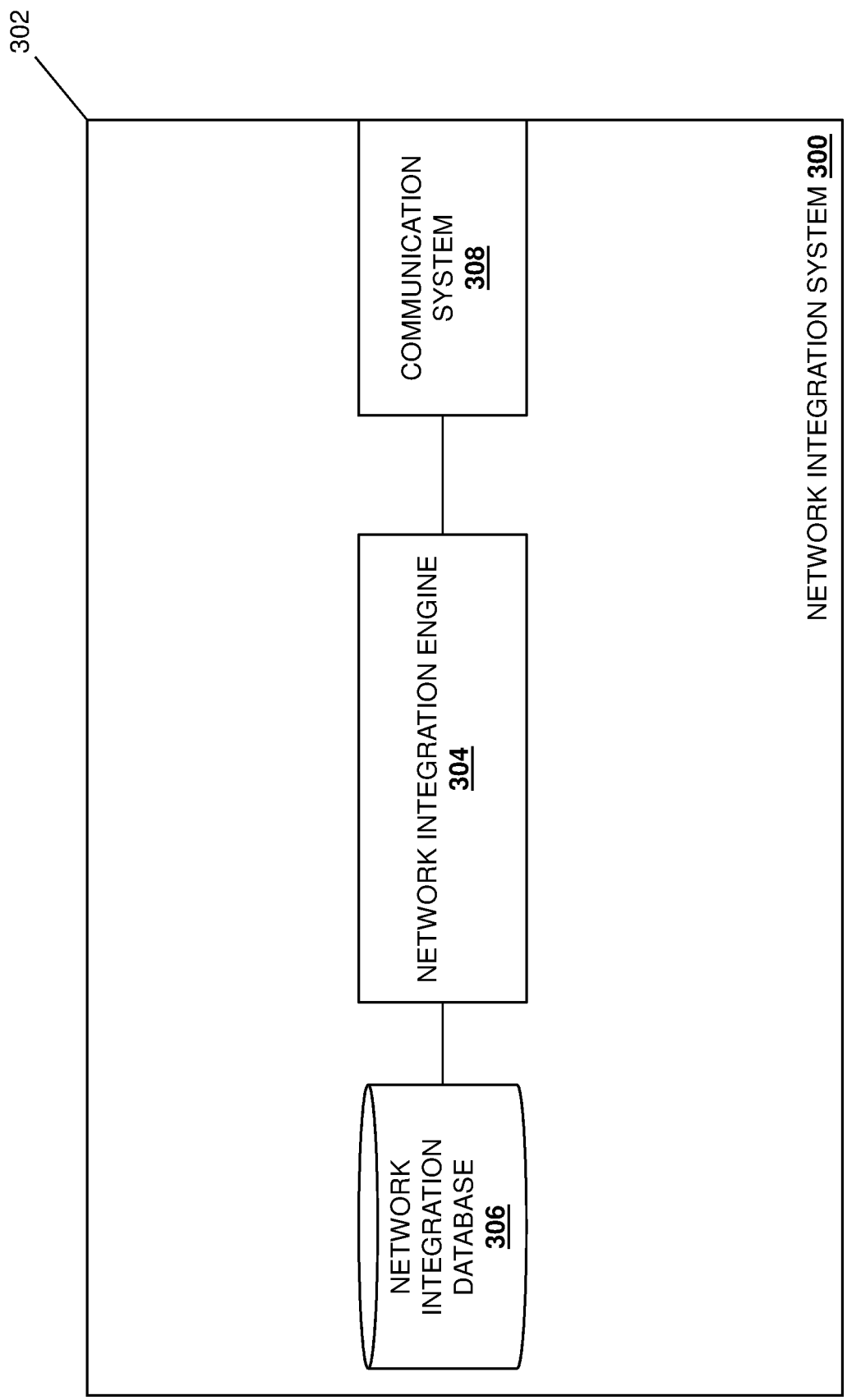
FIG. 3 is a schematic view illustrating an embodiment of a network integration system that may be provided in the networked system of FIG. 2.

Referring now to FIG. 3, an embodiment of a network integration system 300 is illustrated that may provide the network integration system 202 discussed above with reference to FIG. 2. As such, the network integration system 300 may be provided by the IHS 100 discussed above with reference to FIG. 1 and/or may include some or all of the components of the IHS 100, and in specific examples may include one or more server devices that are configured to provide the OpenManage Network Integration (OMNI) system available from DELL EMC® Inc. of Hopkinton, Mass., United States. However, while illustrated and discussed as being provided by a particular network integration system 300, one of skill in the art in possession of the present disclosure will recognize that the functionality of the network integration system 300 discussed below may be provided by other systems and/or devices that are configured to operate similarly as the network integration system 300 discussed below. In the illustrated embodiment, the network integration system 300 includes a chassis 302 that houses the components of the network integration system 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a network integration engine 304 that is configured to perform the functionality of the network integration engines and/or network integration systems discussed below.

The chassis 302 may also house a storage system (not illustrated, but which may include the storage 108 discussed above with reference to FIG. 1) that is coupled to the network integration engine 304 (e.g., via a coupling between the storage system and the processing system) and that includes a network integration database 306 that is configured to store any of the information utilized by the network integration engine 304 discussed below. The chassis 302 may also house a communication system 308 that is coupled to the network integration engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific network integration system 300 has been illustrated, one of skill in the art in possession of the present disclosure will recognize that network integration systems (or other systems and/or devices operating according to the teachings of the present disclosure in a manner similar to that described below for the network integration system 300) may include a variety of components and/or component configurations for providing conventional network integration system functionality, as well as the functionality discussed below, while remaining within the scope of the present disclosure as well.

Figure 4:
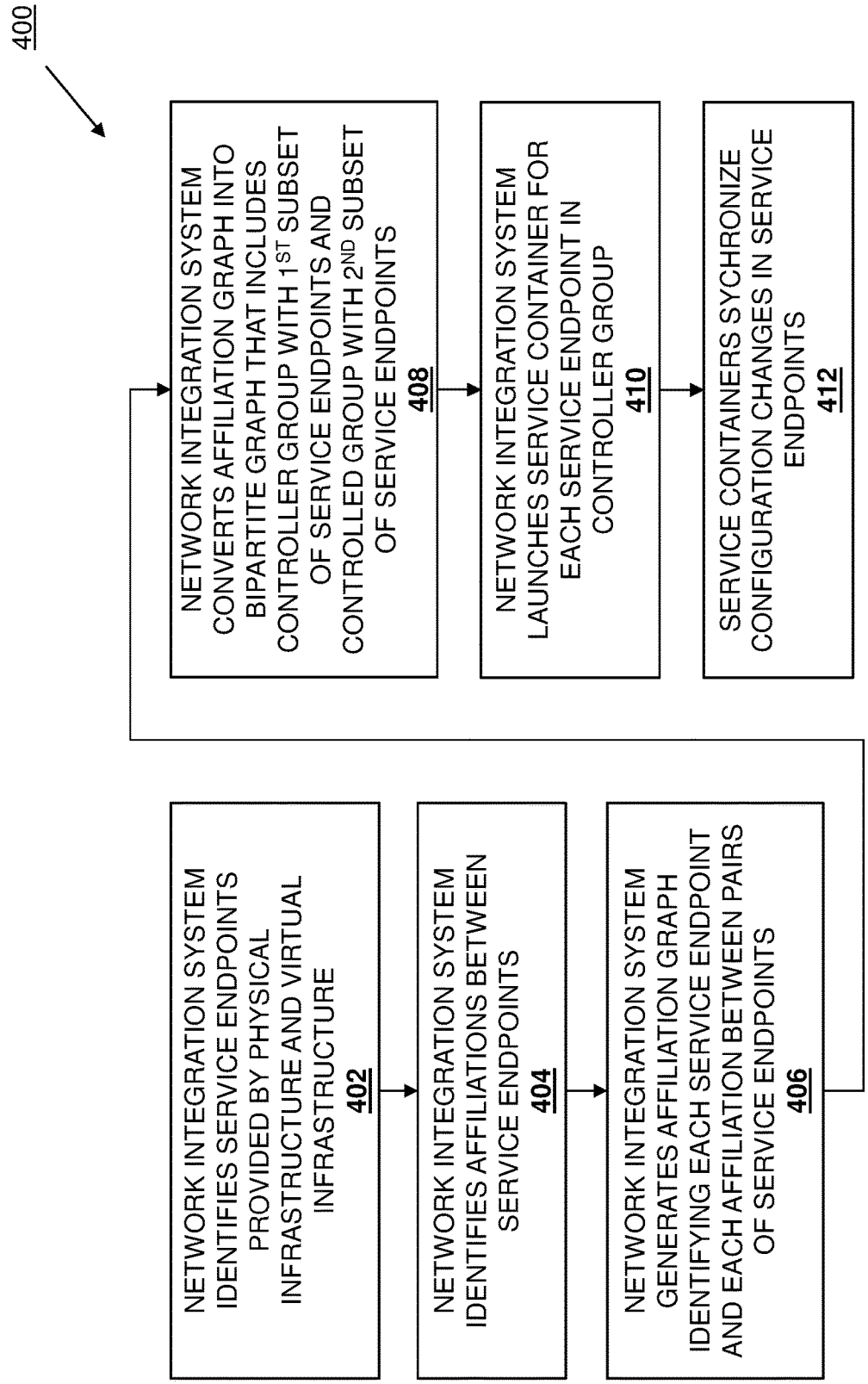
FIG. 4 is a flow chart illustrating an embodiment of a method for integrating physical and virtual infrastructure.

Referring now to FIG. 4, an embodiment of a method 400 for integrating physical and virtual infrastructure is illustrated. As discussed below, the systems and methods of the present disclosure provide for the launching of one service container per "controller" service endpoint provided using physical and/or virtual infrastructure, rather than per "controller"/"controlled" service endpoint pairs provided using physical and/or virtual infrastructure, which reduces the number of service containers required to automate physical/virtual infrastructure configuration in a Software Defined Datacenter. For example, the physical networking/virtual infrastructure management integration system of the present disclosure may include a physical networking infrastructure management system providing physical networking infrastructure management subsystems, a virtual infrastructure management system providing virtual infrastructure management subsystems, and a network integration system. The network integration system identifies at least one affiliation between service endpoints provided by the physical networking infrastructure management subsystems and the virtual infrastructure management subsystems, and generates an affiliation graph that identifies each of the service endpoints and each affiliation between pairs of the service endpoints. The network integration system then converts the affiliation graph to a bipartite graph having a controller group including a first subset of the service endpoints, and having a controlled group including a second subset of the service endpoints, and launches a respective service container for each of the first subset of the service endpoints in the controller group. As such, the systems and methods of the present disclosure provide scalable automated physical networking/virtual infrastructure management integration.

Figure 5:
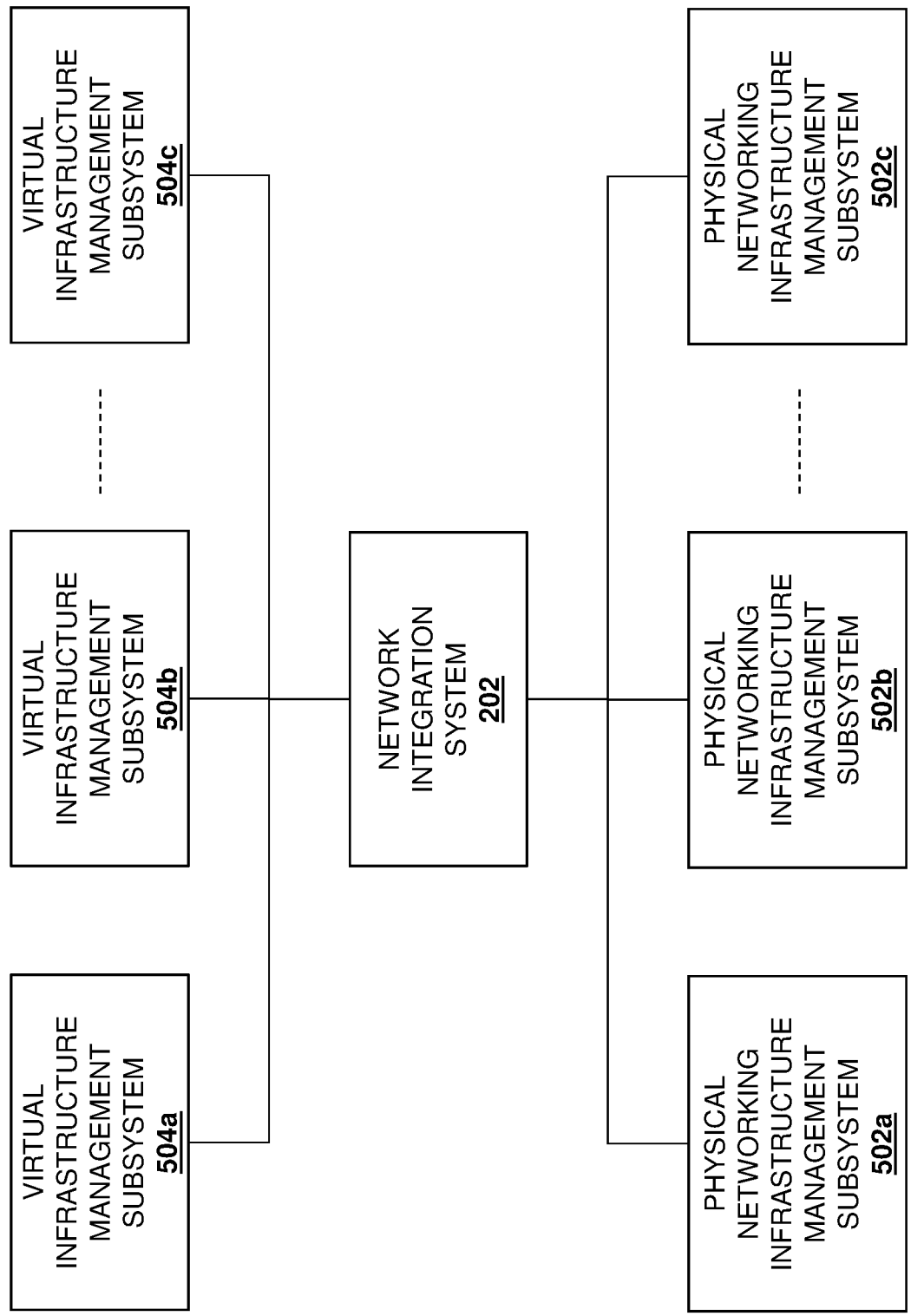
FIG. 5 is a schematic view illustrating an embodiment of the networked system of FIG. 2 operating during the method of FIG. 4.

The method 400 begins at block 402 where a network integration system identifies service endpoints provided by physical infrastructure and virtual infrastructure. In an embodiment, during or prior to block 402, the physical networking management components 206a-206c in the physical networking infrastructure management system 206 and the virtual infrastructure management components 208a-208c in the virtual infrastructure management system 208 may operate to provide a plurality of service endpoints. For example, with reference to FIG. 5, the virtual infrastructure management components 208a-208c in the virtual infrastructure management system 208 may operate to provide a plurality of virtual infrastructure management subsystems 504a, 504b, and up to 504c, each of which is coupled via the network 204 to the network integration system 202. In specific examples, the virtual infrastructure management subsystems 504a-504c may provide "north bound" integrations such as, for example, one of more of the VCENTER® centralized management utility utilized in the examples below and available from VMWARE® of Palo Alto, Calif., United States; one of more WINDOWS® Admin Center systems available from MICROSOFT® corporation of Redmond, Wash., United States; one of more storage controllers, one of more OPENMANAGE ENTERPRISE® systems available from DELL EMC® Inc. of Hopkinton, Mass., United States; one of more OPENSTACK® systems developed by the OpenStack Foundation; one of more Management Services Modules (MSMs) such as the MX7000 MSM for the POWEREDGE® MX7000® modular chassis available from DELL EMC® Inc. of Hopkinton, Mass., United States; and/or one of more other virtual infrastructure management subsystems/"north bound" integrations that would be apparent to one of skill in the art in possession of the present disclosure.

In another example, the physical networking management components 206a-206c in the physical networking infrastructure management system 206 may operate to provide a plurality of physical networking infrastructure management subsystems 502a, 502b, and up to 502c, each of which is coupled via the network 204 to the network integration system 202. In other specific examples, the physical networking infrastructure management subsystems 502a-502c may provide "south bound" integrations such as, for example, one of more SMART FABRIC SERVICES (SFS)® systems utilized in the examples below and available from DELL EMC® Inc. of Hopkinton, Mass., United States; one of more VXRAIL® Hyperconverged Infrastructure systems available from DELL EMC® Inc. of Hopkinton, Mass., United States; one of more POWERONE® converged infrastructure systems available from DELL EMC® Inc. of Hopkinton, Mass., United States; one of more POWEREDGE® MX7000® modular chassis systems available from DELL EMC® Inc. of Hopkinton, Mass., United States; and/or one of more other physical networking infrastructure management subsystems/"south bound" integrations that would be apparent to one of skill in the art in possession of the present disclosure.

In the simplified, specific examples provided below, the virtual infrastructure management subsystems 504a-504c are provided by the VCENTER® centralized management utility discussed above, and operate to provide service endpoints that are referred to as vCenter 1 (VC 1), vCenter 2 (VC 2), vCenter 3 (VC 3), and vCenter 4 (VC 4), while the physical networking infrastructure management subsystems 502a, 502b, and up to 502c are provided by the SMART FABRIC SERVICES (SFS)® discussed above, and operate to provide service endpoints that are referred to as SFS 1, SFS 2, SFS 3, SFS 4, SFS 5, SFS 6, and SFS 7. However, while particular service endpoints provided by particular virtual infrastructure management subsystems and particular physical networking infrastructure management subsystems are described, one of skill in the art in possession of the present disclosure will appreciate that a variety of service endpoints may be provide by a variety of virtual infrastructure and physical infrastructure while remaining within the scope of the present disclosure as well.

Thus, at block 402, the network integration engine 304 in the network integration system 202/300 identifies the service endpoints provided by the physical networking infrastructure management subsystems 502a-502c that are provided by the physical networking management components 206a-206c in the physical networking infrastructure management system 206, and identifies the service endpoints provided by the virtual infrastructure management subsystems 504a-504c that are provided by the virtual infrastructure management components 208a-208c in the virtual infrastructure management system 208. In different embodiments, service endpoints may be identified by the network integration system 202/300 via registration operations, discovery operations, and/or other service endpoint identification operations that would be apparent to one of skill in the art in possession of the present disclosure. For example, a network administrator or other user may register any service endpoint provided by the physical networking infrastructure management subsystems 502a-502c and the virtual infrastructure management subsystems 504a-504c with the network integration engine 304 in the network integration system 202/300 via a network integration system Application Programming Interface (API) service and/or using other registration techniques known in the art. In another example, the network integration engine 304 in the network integration system 202/300 may be configured to discover any service endpoint provided by the physical networking infrastructure management subsystems 502a-502c and the virtual infrastructure management subsystems 504a-504c using a variety of discovery techniques known in the art.

In response to identifying service endpoints at block 402, the network integration engine 304 in the network integration system 202/300 may store any service endpoint information about the identified service endpoints in its network integration database 306. As will be appreciated by one of skill in the art in possession of the present disclosure, service endpoint "roles" (e.g., the "controller" roles or "controlled" roles discussed below) are fluid and may depend on a network integration automation context, and thus the role of any identified service endpoint cannot simply be categorized based on whether that service endpoint is provided by the "north bound" integrations/virtual infrastructure management subsystems or the "south bound" integrations/physical networking infrastructure management subsystems discussed above. For example, while it is often the case that service endpoints provided by "north bound" integrations/virtual infrastructure management subsystems perform a "controller" role for service endpoints provided by "south bound" integrations/physical networking infrastructure management subsystems that operate in a "controlled" role, it may also be the case that service endpoints provided by "south bound" integrations/physical networking infrastructure management subsystems perform a "controller" role for other service endpoints provided by other "south bound" integrations/physical networking infrastructure management subsystems that operate in a "controlled" role.

As such, launching a service container for each "north bound" integration/virtual infrastructure management subsystem (e.g., each registered vCenter) is sub-optimal, as "north bound" integration is not a designation but rather is a role, and in such a role the "north bound" integration acts as an automation driver for the underlying physical network. Thus, a "north bound" integration role is not restricted to virtual network controllers such as vCenter. Rather, a physical network can act as a controller for another physical network, and thus the method of launching a service container per "north bound" integration/virtual infrastructure management subsystem (e.g., each registered vCenter) will neglect to launch service containers for "south bound" integrations/physical networking infrastructure management subsystems (e.g., SFSs) acting as controllers. Furthermore, network integration systems may provide User Interface services to "north bound" integrations/virtual infrastructure management subsystems, and if a "north bound" integration/virtual infrastructure management subsystem is registered for User Interface services but does not need automation services, such techniques will unnecessarily launch service containers for such "north bound" integrations/virtual infrastructure management subsystems. Further still, in the event of a manual override, a registered "north bound" integration/virtual infrastructure management subsystem will not require automation, but such techniques will still unnecessarily launch service containers for such "north bound" integrations/virtual infrastructure management subsystems.

Thus, following block 402, each service endpoint provided by the physical networking infrastructure management subsystems 502a-502c and the virtual infrastructure management subsystems 504a-504c may be identified in the network integration database 306, and one of skill in the art in possession of the present disclosure will appreciate that any new service endpoints provided in the networked system 200 may be identified in a similar manner while remaining within the scope of the present disclosure as well.

The method 400 then proceeds to block 404 where the network integration system identifies affiliations between service endpoints. In an embodiment, at block 404, the network integration engine 306 in the network integration system 202/300 may operate to periodically perform monitoring operations, querying operations, data mining operations, and/or other affiliation identification operations that would be apparent to one of skill in the art in possession of the present disclosure, in order to identify affiliations between service endpoints provided by the physical networking infrastructure management subsystems 502a-502c and the virtual infrastructure management subsystems 504a-504c as discussed above. As such, block 404 of the method 400 and the subsequent blocks 406-412 may be performed any time a configuration change occurs in the networked system 200 for any identified service endpoints. For example, at block 404, the network integration engine 306 in the network integration system 202/300 may monitor and/or query (e.g., via "north bound" integration/virtual infrastructure management subsystem APIs) service endpoints that are provided by "north bound" integrations/virtual infrastructure management subsystems 504a-504c and that are identified in the network integration database 306 in order to extract information about virtual interfaces provided for those service endpoints, server-facing port information for server physical Network Interface Controllers (pNICs), and/or other information that would be apparent to one of skill in the art in possession of the present disclosure.

In another example, at block 404, the network integration engine 306 in the network integration system 202/300 may monitor and/or query (e.g., via "south bound" integration/physical networking infrastructure management subsystem APIs) service endpoints that are provided by "south bound" integrations/physical networking infrastructure management subsystems 502a-502c and that are identified in the network integration database 306 in order to extract information about physical interfaces provided for those service endpoints such as, for example, Link Layer Discovery Protocol (LLDP) information received from connected server ports (e.g., Media Access Controller (MAC) information, asset identifiers, server host names, etc.), and/or other information that would be apparent to one of skill in the art in possession of the present disclosure. As will be appreciated by one of skill in the art in possession of the present disclosure, interface profiles for service endpoints provided by "south bound" integrations/physical networking infrastructure management subsystems 502a-502c (e.g., a server interface profile in SFS) may be identified even when physical links have not yet been provided between physical networking management components 206a-206c in the physical networking infrastructure management system 206.

As will be appreciated by one of skill in the art in possession of the present disclosure, the identification of the virtual interfaces and physical interfaces provided for the service endpoints allows for the identification of affiliations between pairs of service endpoints. In a specific example, at block 404, the network integration engine 306 in the network integration system 202/300 may select a service endpoint (e.g., SFS 1 in this example) identified in the network integration database 306 and, in response, retrieve LLDP information, server interface profile information, discovered server information, and/or other service endpoint information about that service endpoint that would be apparent to one of skill in the art in possession of the present disclosure. The network integration engine 306 in the network integration system 202/300 may then select a service endpoint (e.g., VC 1 in this example) identified in the network integration database 306 and, in response, retrieve server pNIC information, MAC information, asset identifier information, and/or other service endpoint information about that service endpoint that would be apparent to one of skill in the art in possession of the present disclosure.

As will be appreciated by one of skill in the art in possession of the present disclosure, an affiliation between any two service endpoints may be identified in a variety of manners. For example, continuing with the specific examples discussed above, VXRAIL® and POWERONE® "south bound" integrations/physical networking infrastructure management subsystems use MAC addresses in Virtual Machine NICs in vCenter, as well as in server interface profiles in SFS, and thus those MAC addresses may be utilized to identify an affiliation between those "south bound" integrations/physical networking infrastructure management subsystems.

However, one of skill in the art in possession of the present disclosure will appreciate that the network automation provided according to the teachings of the present disclosure may operate to map virtual infrastructure components to physical components in a variety of manners that will fall within the scope of the present disclosure. For example, a commonly modified physical configuration is the server interface profile, which one of skill in the art in possession of the present disclosure will recognize represents a "front-facing" port on a switch that is currently connected to one a server device/compute node, and the network automation of the present disclosure may operate to map some of the virtual infrastructure components to server interface profiles. In a specific example using VXRAIL® and POWERONE® discussed above, the network automation may include identifying virtual infrastructure components that represents the service devices/compute nodes (e.g., VMWARE® terminology for such virtual object is "hosts"). The network automation may then operate to identify the virtual NICs of the "host", and one of skill in the art in possession of the present disclosure will appreciate that each virtual NIC will be associated with a physical NIC that is physically connected to a front facing port/server interface profile. As such, the network automation may then operate to attempt to match the virtual NICs and the server interface profiles via the virtual NIC MAC addresses and server interface profiles identifiers, and when those values match, automated configuration may be performed.

However, other solutions may provide different techniques for linking the physical infrastructure and the virtual infrastructure. For example, another solution may include matching operations based on the name of a virtual NIC rather than its MAC address, and one of skill in the art in possession of the present disclosure will appreciate that, in order to find these relationships, the interfaces of all of the services may be scanned in an attempt to perform the matching operations discussed above. In the event match(es) are found, it may be assumed that a northbound/virtual infrastructure has some of it components (e.g., the virtual NIC discussed above) that matches components (e.g., the server interface profile discussed above) in a southbound component (e.g., the SFS discussed above), and the network automation may then determine that the Services are affiliated as a result of those match(es).

With reference to FIG. 6, in some embodiments and for any pair of affiliated service endpoints, affiliation information about those affiliated service endpoints may be stored in a service endpoint affiliation table 600. As can be seen in the example provided in FIG. 6, the service endpoint affiliation table 600 includes a first service endpoint column 602 that identifies a first service endpoint included in an affiliation, a second service endpoint column 604 that identifies a second service endpoint included in an affiliation, an affiliation attribute column 606 that identifies an attribute that was used to identify the affiliation between the first service endpoint and the second service endpoint, an affiliation value column 608 that identifies a value of the affiliation between the first service endpoint and the second service endpoint, a method column 610 that identifies a method by which the affiliation between the first service endpoint and the second service endpoint was determined, and an override/(disable?) column that identifies whether the affiliation between the first service endpoint and the second service endpoint was overridden or disabled.

Thus, the example in FIG. 6 illustrates how the service endpoint affiliation table 600 may include a MAC address affiliation (with a value of "00:0a:95:9d:68:17") between service endpoints VC 1 and SFS 1 that was identified dynamically and not overridden, a MAC address affiliation (with a value of "00:0a:95:9d:68:16") between service endpoints SFS 4 and VC 1 that was identified dynamically and not overridden, a MAC address affiliation (with a value of "00:0a:95:9d:68:18") between service endpoints VC 2 and SFS 2 that was identified dynamically and not overridden, an asset tag/identifier affiliation (with a value of "6XVHV") between service endpoints VC 3 and SFS 4 that was pre-provisioned and not overridden, a MAC address affiliation (with a value of "00:0a:95:9d:68:19") between service endpoints SFS 5 and VC 3 that was identified dynamically and not overridden, an asset tag/identifier affiliation (with a value of "7SHV6") between service endpoints SFS 2 and VC 4 that was pre-provisioned and overridden, a MAC address affiliation (with a value of "00:0a:95:9d:68:20") between service endpoints VC 2 and SFS 1 that was identified dynamically and not overridden, a MAC address affiliation (with a value of "00:0a:95:9d:68:21") between service endpoints VC 3 and SFS 1 that was identified dynamically and not overridden, a MAC address affiliation (with a value of "00:0a:95:9d:68:22") between service endpoints SFS 2 and VC 3 that was identified dynamically and not overridden, a MAC address affiliation (with a value of "00:0a:95:9d:68:23") between service endpoints SFS 5 and SFS 6 that was identified dynamically and not overridden, a lack of affiliation with a service endpoint SFS 7 (with a MAC address of "00:0a:95:9d:68:24") that was identified dynamically and not overridden, and a MAC address affiliation (with a value of "00:0a:95:9d:68:25") between service endpoints VC 2 and SFS 3 that was identified dynamically and not overridden. However, while only MAC addresses and asset tags/identifiers are illustrated and described as providing affiliations in the example above, one of skill in the art in possession of the present disclosure will appreciate that other attributes (e.g., server instance profiles, Peripheral Component Interconnect express (PCIe) addresses, etc.) may be used to identify affiliations while remaining within the scope of the present disclosure as well.

Figure 7:
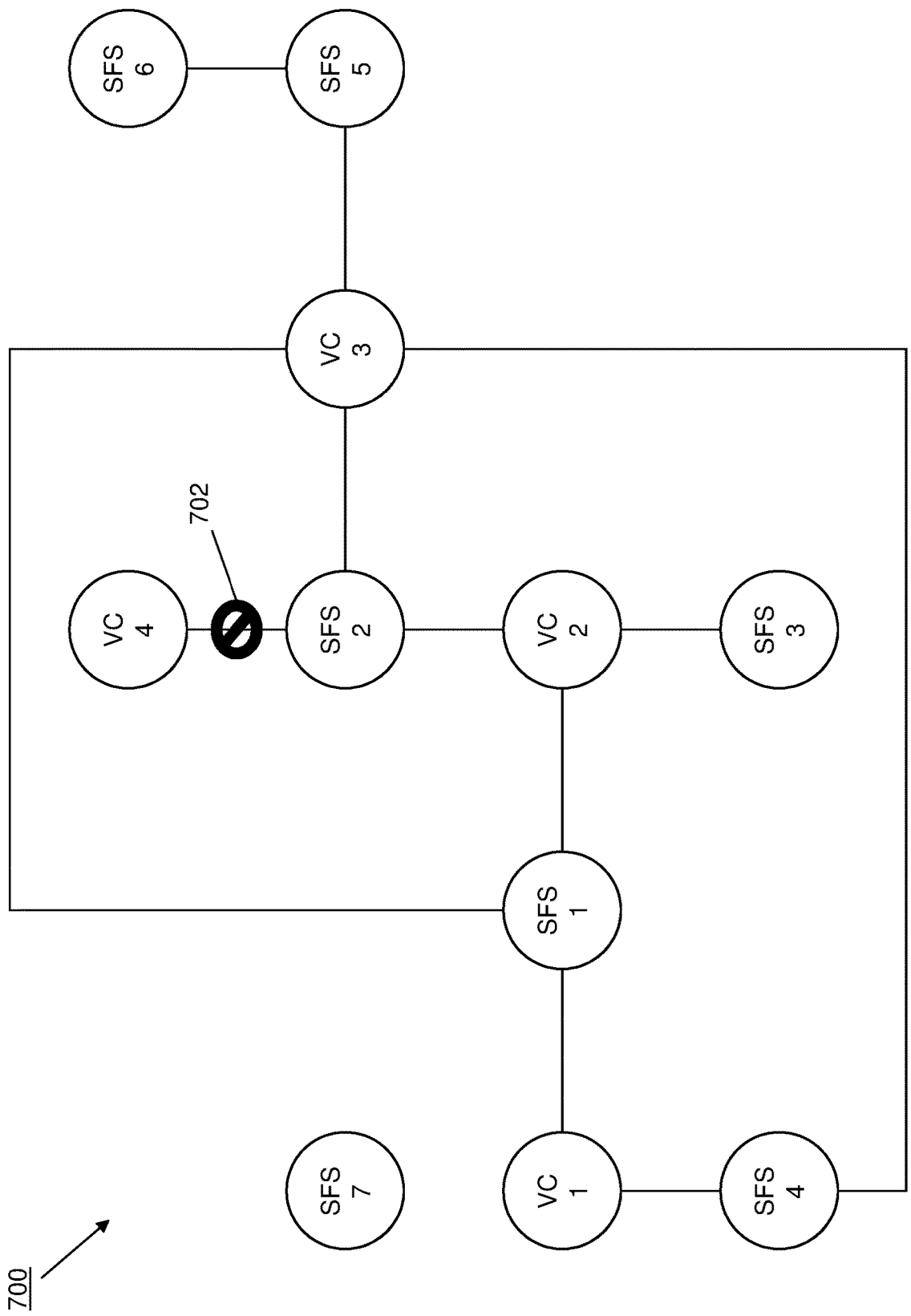
FIG. 7 is a schematic view illustrating an affiliation graph generated by the network integration system of FIG. 3 during the method of FIG. 4.

The method 400 then proceeds to block 406 where the network integration system generates an affiliation graph identifying each service endpoint and each affiliation between pairs of service endpoints. In an embodiment, at block 406, the network integration engine 304 in the network integration system 202/300 may generate an affiliation graph that identifies each service endpoint identified at block 402, and each affiliation identified at block 404 between pairs of service endpoints. For example, with reference to FIG. 7 and continuing with the example of service endpoint affiliation table 600 discussed above, at block 406 the network integration engine 304 in the network integration system 202/300 may generate an affiliation graph 700 that includes a vertex for each service endpoint identified at block 402 (e.g., VC 1-4 and SFS 1-7), and an edge for each affiliation identified at block 404 between pairs of service endpoints. As will be appreciated by one of skill in the art in possession of the present disclosure, the affiliation graph 700 is an undirected graph G defined as:

G=(U, V, W, E)

Where U is of size n and identifies a disjointed set of "controller" service endpoints with affiliations in V, V is of size m and identifies a disjointed set of "controlled" service endpoints with affiliations in U, E identifies a set of edges that connect elements in U to at least one element in V, and W is of size k and identifies a disjointed set of service endpoints with no affiliations in V or W. As will be appreciated by one of skill in the art in possession of the present disclosure, the following relationship will typically hold given the definitions above:

k<n<m

As such, the affiliation graph 700 identifies affiliations between VC 1 and SFS 1/SFS 2, affiliations between VC 2 and SFS 1/SFS 2/SFS3, affiliations between VC 3 and SFS1/SFS 4/SFS5, an affiliation between VC 4 and SFS 2 that has been overridden (as indicated by element 702 in FIG. 7), an affiliation between SFS 6 and SFS 5, and no affiliation between SFS7 and another service endpoint.

Figure 8:
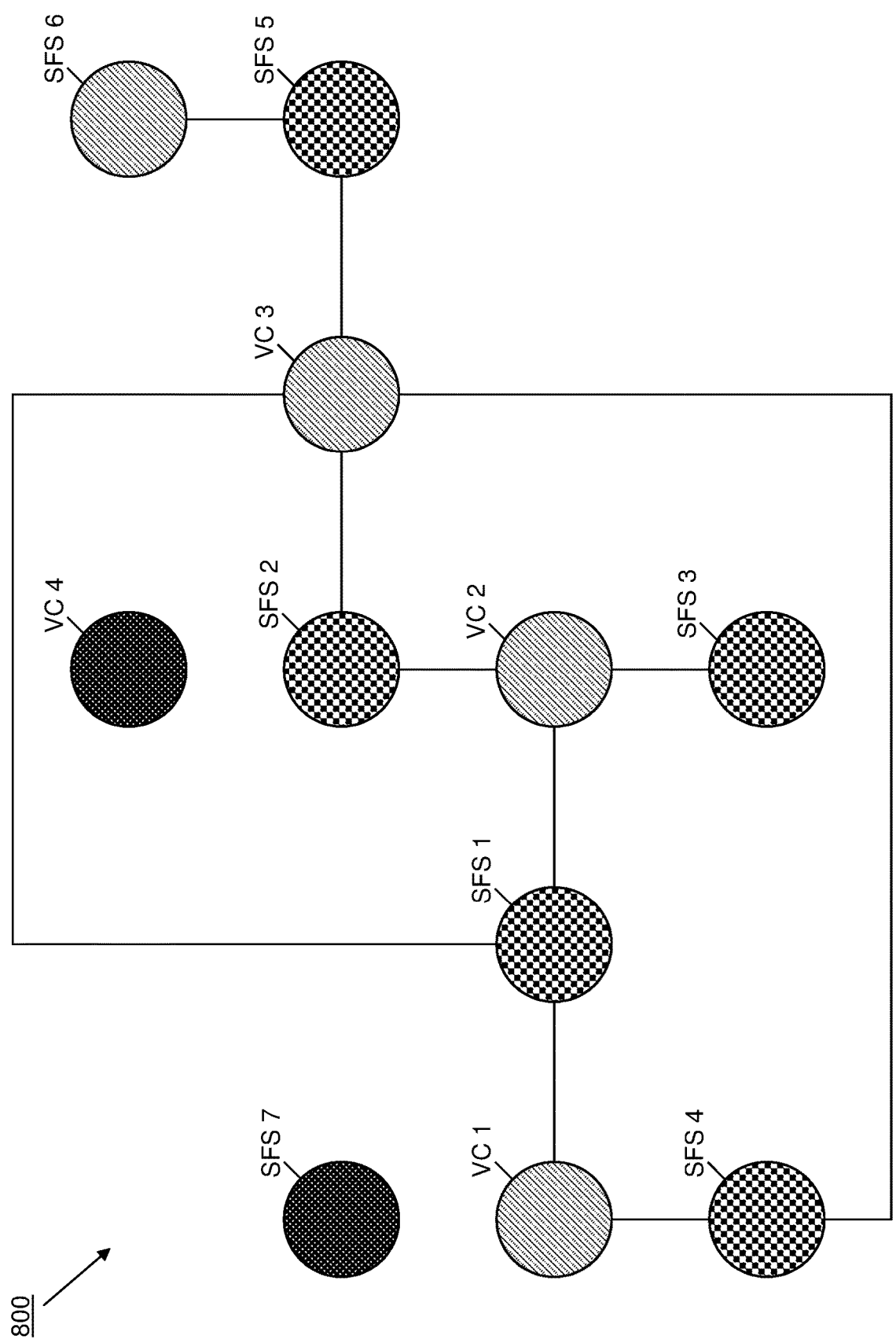
FIG. 8 is a schematic view illustrating a vertex colored affiliation graph generated by the network integration system of FIG. 3 during the method of FIG. 4.

The method 400 then proceeds to block 408 where the network integration system converts the affiliation graph into a bipartite graph that include a controller group with a first subset of the service endpoints, and a controlled group with a second subset of the service endpoints. In an embodiment, at block 408, the network integration engine 304 in the network integration system 202/300 may operate to convert the affiliation graph to a bipartite graph by performing vertex coloring operations on the service endpoints/vertices in the affiliation graph. As will be appreciated by one of skill in the art in possession of the present disclosure, vertex coloring is a form of graph labeling that provides for the coloring of vertices in a graph such that no two adjacent vertices are of the same color. Thus, continuing with the example above, the network integration engine 304 in the network integration system 202/300 may operate to convert the affiliation graph 700 to a bipartite graph by performing vertex coloring operations on the service endpoints/vertices in the affiliation graph 700. With reference to FIG. 8, a vertex colored affiliation graph 800 is illustrated that may be provided via the vertex coloring operations on the service endpoints/vertices in the affiliation graph 700, and provides the service endpoints VC 1, VC 2, VC 3, and SFS 6 with a first color, the service endpoints SFS 1, SFS 2, SFS 3, SFS 4, and SFS 5 with a second color, and the service endpoints VC 4 and SFS 7 with a third color.

With reference to FIG. 9, the network integration engine 304 in the network integration system 202/300 may then use the vertex colored affiliation graph 800 to generate a bipartite graph 900 with a controller group 902 including service endpoints VC 1, VC 2, VC 3, and SFS 6; a controlled group 904 with the service endpoints SFS 1, SFS 2, SFS 3, SFS 4, and SFS 5; and an unaffiliated group 906 with the service endpoints VC 4 and SFS 7. As will be appreciated by one of skill in the art in possession of the present disclosure, using the convention provided above for the undirected graph G, the bipartite graph 900 may be defined as follows:

$G_1 = (U, V, W, E)$
U={VC 1, VC 2, VC 3, SFS 6}
V={SFS 1, SFS 2, SFS 3, SFS 4, SFS 5}
W={VC 4, SFS 7}
E={(VC 1, SFS 1), (VC 1, SFS 4), (VC 2, SFS 1), (VC 2, SFS 2), (VC 2, SFS 3), (VC 3, SFS 1), (VC 3, SFS 2), (VC 3, SFS 4), (VC 3, SFS 5), (SFS 5, SFS 6)}

In other words, and as illustrated in the bipartite graph 900, the service endpoint VC 1 in the controller group 902 includes affiliations with the service endpoints SFS 1 and SFS 4 in the controlled group 904, the service endpoint VC 2 in the controller group 902 includes affiliations with the service endpoints SFS 1, SFS 2, and SFS 3 in the controlled group 904, the service endpoint VC 3 in the controller group 902 includes affiliations with the service endpoints SFS 2 and SFS 5 in the controlled group 904, and the service endpoint SFS 6 in the controller group 902 includes an affiliation with the service endpoint SFS 5 in the controlled group 904. Furthermore, the bipartite graph 900 illustrates how the service endpoint VC 4 has no affiliation with other service endpoints (e.g., due to a user override as discussed in the example above), and how the service endpoint SFS 7 has no affiliation with other service endpoints. Thus, the vertex coloring operations on the affiliation graph 700 provide a bipartite graph 900 with two disjointed sets (U and V in the example above) of service endpoints/vertices with different colors, and another set (W in the example above) that tracks service endpoints/vertices without any service endpoint affiliations. As discussed in further detail below, the bipartite graph 900 provides a relatively straightforward, fast, and deterministic technique for launching a minimum number of service containers by traversing through the disjointed set U and creating a service container for performing automation operations for each element included therein.

The method 400 then proceeds to block 410 where the network integration system launches a service container for each service endpoint in the controller group. With reference to the example provided above, in an embodiment of block 410, the network integration engine 304 in the network integration system 202/300 may launch a service container for each service endpoint VC 1, VC 2, VC 3, and SFS 6 in the "controller" group 902 provided by the bipartite graph 900. For example, at block 410, the network integration engine 304 in the network integration system 202/300 may traverse through each service endpoint in the "controller" group (each vertex in the set U of the bipartite graph 900) and launch a service container that is configured to perform automation operations for that service endpoint. As will be appreciated by one of skill in the art in possession of the present disclosure, the number of "north bound" integrations/virtual infrastructure management subsystems will are typically less than the number of "south bound" integrations/physical networking infrastructure management subsystems, and thus the launching of service containers for each service endpoint in the "controller" group (each vertex in the set U of the bipartite graph 900) may provide for the launching of a minimum number of service containers.

To summarize, after all of the affiliations between services are found as discussed above, those affiliations may be utilized to generate an affiliation graph where edges between two pairs of nodes implies those service affiliations. However, in order to make that affiliation graph more useful, a subset of endpoints that need automation containers may be generated by converting that affiliation graph into a bipartite graph that provides a set of all service endpoints that are affiliated with at least one other service endpoint that is not found in the current set, and which provide the northbound services of the present disclosure that must then be monitored. As discussed in further detail below, in order to monitor those northbound services, an automation service container may then be launched for each of these services, and may operate to periodically scan the services for changes. If a change is found, the automation service containers may then publish tasks onto a task queue to provide an indication of virtual Infrastructure components that have been changed. Those tasks may then be picked up by an automation worker that uses the information in those tasks (e.g., the identified virtual infrastructure components and the affiliation information) to configure all of the related endpoints (affiliated services) of the monitored endpoint.

The method 400 then proceeds to block 412 where the service containers synchronize changes in the service endpoints. In an embodiment, at block 412 and following the launching of the service containers at block 410, the network integration engine 304 in the network integration system 202/300 may detect a change to a service endpoint and, in response, publish a task to a queue that identifies the service endpoint that experienced the change. For example, the network integration engine 304 in the network integration system 202/300 may detect a change to a "north bound" integration/virtual infrastructure management subsystem 504*a*, 504*b*, or 504*c* and, in response, may publish a corresponding task to the queue that identifies that "north bound" integration/virtual infrastructure management subsystem.

Service containers may be subscribed to the queue and may operate to process the tasks published thereto by, for example, identifying the service endpoint identified in the task as having experienced the change, querying that service endpoint to identify an interface for that service endpoint, and then querying the bipartite graph for any interfaces on service endpoints that are affiliated with the service endpoint that experienced the change. Thus, continuing with the example above, a service container may identify the "north bound" integration/virtual infrastructure management subsystem identified in the task as having experienced the change, query that "north bound" integration/virtual infrastructure management subsystem to identify a virtual interface for that "north bound" integration/virtual infrastructure management subsystem, and then query the bipartite graph for any "south bound" integration/physical networking infrastructure management subsystem interfaces that are affiliated with the "north bound" integration/virtual infrastructure management subsystem that experienced the change. Thus, virtual interfaces may be matched with physical interface, and service containers may use any virtual interface information identified as having changed in order to configure corresponding changes on the affiliated physical interfaces on the "south bound" integration/physical networking infrastructure management subsystem.

In some embodiments, the network integration system 202/300 may employ a queue service that queues tasks, and may operate to process tasks in the queue. As such, in a specific example, the network integration system 202/300 may be configured to provide automation for the "north bound" integrations/virtual infrastructure management subsystems, and may monitors the queue for tasks for each service endpoint provided by a "north bound" integration/virtual infrastructure management subsystem. The network integration system 202/300 may then publish tasks with information about "north bound" integrations/virtual infrastructure management subsystems, and service containers may then acquire changed virtual interfaces by querying any "north bound" integration/virtual infrastructure management subsystem specified in a task. Service containers may then look up affiliated "south bound" integrations/physical networking infrastructure management subsystems and their virtual interface relationships in the network integration database 306, and subsequently configure the physical interfaces on the "south bound" integrations/physical networking infrastructure management subsystems in order to reflect the changes on the corresponding virtual interfaces.

Continuing with the specific examples provided above, the network integration system 202/300 may monitor vCenter for any changes to host networking in the server devices that provide it and, when a change is detected, the network integration system 202/300 may publish a task to the queue that includes the vCenter hostname and a list of hosts that have been modified. The service containers will detect those tasks, and will query the vCenter for each host to retrieve the virtual interface (e.g., a virtual NIC) on that host, as well as port groups associated with that virtual interface. The service containers will then also query physical interfaces (e.g., server interface profiles) whose information is stored in the network integration database 306, and any physical interface with the same MAC address as the virtual interface may be matched in order to determine which SFS to query, and that SFS (e.g., the SFS matched to the virtual interface) may then be used to configure the physical interface.

Thus, systems and methods have been described that provide for the launching of one service container per "controller" service endpoint, rather than per "controller"/"controlled" service endpoint pairs, which reduces the number of service containers required to automate physical/virtual infrastructure configuration in a Software Defined Datacenter. For example, the physical networking/virtual infrastructure management integration system of the present disclosure may build a service endpoint affiliation table that captures dynamic relationships between various interfaces and converts those into a bipartite graph that enables the launching of a minimum number of service containers. As such, any arbitrary hierarchical span of physical networks controlling other physical networks may be optimally derived using an affiliation table, which results in the performance of all required automation tasks regardless of whether a virtual network controller or physical network operate as a controller for another physical network. The techniques described herein reduce the number of launched service containers from (n×m) to less than (n+m+1), where the n is the number of controllers and m is the number of network fabrics, and provides resources savings by reducing quadratic complexity $O(nm)$ to linear complexity $O(n+m+1) \sim O(n)$.

As will be appreciated by one of skill in the art in possession of the present disclosure, the method 400 may be triggered by service endpoint changes, and thus any new service endpoint affiliations may be handled relatively quickly conserve resources (e.g., if a change results in a vCenter no longer having affiliations with any other endpoint services, a service container previously launched for that vCenter may be shut down). Thus, service endpoint "controllers" and "controlled" service endpoints are queried less (due to a lack of overlap between service containers), resulting in compute resource savings. Furthermore, the systems and methods of the present disclosure may be provided "on-premises" or via cloud deployments, and service endpoint "controllers" and "controlled" service endpoints may be provided in the same management domain, or disparate management domains. As will be appreciated by one of skill in the art in possession of the present disclosure, the techniques described herein break down complex hierarchical relationships between service endpoints into simplified bipartite connections, and yield an improved user experience based on the serviceability and debuggability associated with the fewer service containers utilized therein.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A physical networking/virtual infrastructure management integration system, comprising:
    a physical networking infrastructure management system that is configured to provide a plurality of physical networking infrastructure management subsystems;
    a virtual infrastructure management system that is configured to provide a plurality of virtual infrastructure management subsystems; and
    a network integration system that is coupled to the physical networking infrastructure management system and the virtual infrastructure management system, wherein the network integration system is configured to:
        identify at least one affiliation between a plurality of service endpoints provided by the plurality of physical networking infrastructure management subsystems and the plurality of virtual infrastructure management subsystems;
        generate an affiliation graph that identifies each of the plurality of service endpoints and each affiliation between pairs of the plurality of service endpoints;
        convert the affiliation graph to a bipartite graph that includes a controller group including a first subset of the plurality of service endpoints and a controlled group including a second subset of the plurality of service endpoints; and
        launch a respective service container for each of the first subset of the plurality of service endpoints in the controller group.

2. The system of claim 1, wherein the converting the affiliation graph to the bipartite graph includes:
    performing vertex coloring operations on the plurality of service endpoints in the affiliation graph to associate a first color with the first subset of the plurality of service endpoints; and
    grouping the first subset of the plurality of service endpoints in the controller group based on the first color.

3. The system of claim 1, the network integration system is configured to:
    identify the plurality of service endpoints by:

discovering at least one of the plurality of service endpoints; and determining at least one of the plurality of service endpoints has been registered.

4. The system of claim 1, wherein the network integration system is configured to identify the at least one affiliation between the plurality of service endpoints by:

retrieving first affiliation information from a virtual interface provided by at least one of the plurality of virtual infrastructure management subsystems for a first service endpoint included in the plurality of service endpoints;

retrieving second affiliation information from a physical interface provided by at least one of the plurality of physical infrastructure management subsystems for a second service endpoint included in the plurality of service endpoints; and identifying a first affiliation between the first service endpoint and the second service endpoint.

5. The system of claim 1, wherein the network integration system is configured to identify the at least one affiliation between the plurality of service endpoints by:

retrieving first affiliation information from a first physical interface provided by at least one of the plurality of physical infrastructure management subsystems for a first service endpoint included in the plurality of service endpoints;

retrieving second affiliation information from a second physical interface provided by at least one of the plurality of physical infrastructure management subsystems for a second service endpoint included in the plurality of service endpoints; and identifying a first affiliation between the first service endpoint and the second service endpoint.

6. The system of claim 1, wherein the network integration system is configured to:

identify, using a first respective service container launched for a first service endpoint in first subset of the plurality of service endpoints in the controller group, a first configuration change in the first service endpoint;

determine, using the first respective service container, at least one second service endpoint that is included in the second subset of the plurality of service endpoints in the controlled group and that includes an affiliation with the first service endpoint; and perform, using the first respective service container, a second configuration change that is associated with the first configuration change on each second service endpoint.

7. An Information Handling System (IHS), comprising:
a processing system; and
a memory system that is coupled to the processing system and that includes instructions that, when executed by the processing system, cause the processing system to provide a network integration engine that is configured to:

identify at least one affiliation between a plurality of service endpoints provided by a plurality of physical networking infrastructure management subsystems included in a physical networking infrastructure management system and a plurality of virtual infrastructure management subsystems included in a virtual infrastructure management system;

generate an affiliation graph that identifies each of the plurality of service endpoints and each affiliation between pairs of the plurality of service endpoints;

convert the affiliation graph to a bipartite graph that includes a controller group including a first subset of the plurality of service endpoints and a controlled group including a second subset of the plurality of service endpoints; and launch a respective service container for each of the first subset of the plurality of service endpoints in the controller group.

8. The IHS of claim 7, wherein the converting the affiliation graph to the bipartite graph includes:

performing vertex coloring operations on the plurality of service endpoints in the affiliation graph to associate a first color with the first subset of the plurality of service endpoints; and grouping the first subset of the plurality of service endpoints in the controller group based on the first color.

9. The IHS of claim 7, the network integration engine is configured to:

identify the plurality of service endpoints by:
discovering at least one of the plurality of service endpoints; and
determining at least one of the plurality of service endpoints has been registered.

10. The IHS of claim 7, wherein the network integration engine is configured to identify the at least one affiliation between the plurality of service endpoints by:

retrieving first affiliation information from a virtual interface provided by at least one of the plurality of virtual infrastructure management subsystems for a first service endpoint included in the plurality of service endpoints;

retrieving second affiliation information from a physical interface provided by at least one of the plurality of physical infrastructure management subsystems for a second service endpoint included in the plurality of service endpoints; and identifying a first affiliation between the first service endpoint and the second service endpoint.

11. The IHS of claim 7, wherein the network integration engine is configured to identify the at least one affiliation between the plurality of service endpoints by:

retrieving first affiliation information from a first physical interface provided by at least one of the plurality of physical infrastructure management subsystems for a first service endpoint included in the plurality of service endpoints;

retrieving second affiliation information from a second physical interface provided by at least one of the plurality of physical infrastructure management subsystems for a second service endpoint included in the plurality of service endpoints; and identifying a first affiliation between the first service endpoint and the second service endpoint.

12. The IHS of claim 7, wherein the network integration engine is configured to:

identify, using a first respective service container launched for a first service endpoint in first subset of the plurality of service endpoints in the controller group, a first configuration change in the first service endpoint;

determine, using the first respective service container, at least one second service endpoint that is included in the second subset of the plurality of service endpoints in the controlled group and that includes an affiliation with the first service endpoint; and perform, using the first respective service container, a second configuration change that is associated with the first configuration change on each second service endpoint.

13. The IHS of claim 7, wherein the launching the respective service container for each of the first subset of the plurality of service endpoints in the controller group includes:
launching a first respective service container for a first service endpoint that is included in the first subset of the plurality of service endpoints in the controller group and that includes respective affiliations with at least two of the second subset of the plurality of service endpoints in the controlled group.

14. A method for integrating physical and virtual infrastructure, comprising:
identifying, by a network integration system, at least one affiliation between a plurality of service endpoints provided by a plurality of physical networking infrastructure management subsystems included in a physical networking infrastructure management system and a plurality of virtual infrastructure management subsystems included in a virtual infrastructure management system;
generating, by the network integration system, an affiliation graph that identifies each of the plurality of service endpoints and each affiliation between pairs of the plurality of service endpoints;
converting, by the network integration system, the affiliation graph to a bipartite graph that includes a controller group including a first subset of the plurality of service endpoints and a controlled group including a second subset of the plurality of service endpoints; and
launching, by the network integration system, a respective service container for each of the first subset of the plurality of service endpoints in the controller group.

15. The method of claim 14, wherein the converting the affiliation graph to the bipartite graph includes:
performing, by the network integration system, vertex coloring operations on the plurality of service endpoints in the affiliation graph to associate a first color with the first subset of the plurality of service endpoints; and
grouping, by the network integration system, the first subset of the plurality of service endpoints in the controller group based on the first color.

16. The method of claim 14, further comprising:
identifying, by the network integration system, the plurality of service endpoints by:
discovering, by the network integration system, at least one of the plurality of service endpoints; and
determining, by the network integration system, at least one of the plurality of service endpoints has been registered.

17. The method of claim 14, wherein the identifying the at least one affiliation between the plurality of service endpoints includes:
retrieving, by the network integration system, first affiliation information from a virtual interface provided by at least one of the plurality of virtual infrastructure management subsystems for a first service endpoint included in the plurality of service endpoints;
retrieving, by the network integration system, second affiliation information from a physical interface provided by at least one of the plurality of physical infrastructure management subsystems for a second service endpoint included in the plurality of service endpoints; and
identifying, by the network integration system, a first affiliation between the first service endpoint and the second service endpoint.

18. The method of claim 14, wherein the identifying the at least one affiliation between the plurality of service endpoints includes:
retrieving, by the network integration system, first affiliation information from a first physical interface provided by at least one of the plurality of physical infrastructure management subsystems for a first service endpoint included in the plurality of service endpoints;
retrieving, by the network integration system, second affiliation information from a second physical interface provided by at least one of the plurality of physical infrastructure management subsystems for a second service endpoint included in the plurality of service endpoints; and
identifying, by the network integration system, a first affiliation between the first service endpoint and the second service endpoint.

19. The method of claim 14, further comprising:
identifying, by the network integration system using a first respective service container launched for a first service endpoint in first subset of the plurality of service endpoints in the controller group, a first configuration change in the first service endpoint;
determining, by the network integration system using the first respective service container, at least one second service endpoint that is included in the second subset of the plurality of service endpoints in the controlled group and that includes an affiliation with the first service endpoint; and
performing, by the network integration system using the first respective service container, a second configuration change that is associated with the first configuration change on each second service endpoint.

20. The method of claim 14, wherein the launching the respective service container for each of the first subset of the plurality of service endpoints in the controller group includes:
launching, by the network integration system, a first respective service container for a first service endpoint that is included in the first subset of the plurality of service endpoints in the controller group and that includes respective affiliations with at least two of the second subset of the plurality of service endpoints in the controlled group.

* * * * *